US011183966B2

(12) United States Patent
Parrott et al.

(10) Patent No.: US 11,183,966 B2
(45) Date of Patent: Nov. 23, 2021

(54) FRONT-HEAVY DUST CLEANING VEHICLE (71) Applicant: Saudi Arabian Oil Company, Dhahran (SA)

(72) Inventors: Brian Parrott, Thuwal (SA); Pablo Carrasco Zanini, Thuwal (SA); Ali AlShehri, Thuwal (SA)

(73) Assignee: Saudi Arabian Oil Company, Dhahran (SA)

(*) Notice: Subject to any disclaimer, the term of this patent is extended or adjusted under 35 U.S.C. 154(b) by 330 days.

(21) Appl. No.: 16/386,881

(22) Filed: Apr. 17, 2019

(65) Prior Publication Data
US 2019/0245481 A1    Aug. 8, 2019

Related U.S. Application Data

(62) Division of application No. 15/240,601, filed on Aug. 18, 2016, now Pat. No. 10,305,420.
(Continued)

(51) Int. Cl.
*H02S 40/10* (2014.01)
*B08B 1/04* (2006.01)
(Continued)

(52) U.S. Cl.
CPC ............ *H02S 40/10* (2014.12); *A46B 13/001* (2013.01); *A46B 13/02* (2013.01); *B08B 1/002* (2013.01);
(Continued)

(58) Field of Classification Search
CPC ....... H02S 40/10; A46B 13/001; A46B 13/02; B08B 1/002; B08B 1/04
See application file for complete search history.

(56) References Cited

U.S. PATENT DOCUMENTS 3,194,178 A    7/1965  Weston
6,269,750 B1   8/2001  Cornwell et al.
(Continued)

FOREIGN PATENT DOCUMENTS

CN    101291712 A    10/2008
CN    102446982 A    5/2012
(Continued)

OTHER PUBLICATIONS

Japanese Office Action in Corresponding Japanese Patent Application No. 2018-510436 dated Aug. 24, 2020. 13 pages.
(Continued)

*Primary Examiner* — Weilun Lo
(74) *Attorney, Agent, or Firm* — Leason Ellis LLP (57) ABSTRACT

In one embodiment, a cleaning vehicle for cleaning a surface of an object includes first and second carriages (that define a frame). The vehicle also includes first and second wheels coupled to the first and second carriages to form a drive assembly and at least one motor is operatively coupled to at least one of the first and second wheels. A cleaning element extends between and is supported by the first and second carriages at a location forward of the first and second wheels. The vehicle also includes third and fourth wheels. The third wheel is adjustably mounted relative to the first wheel and the second traveler wheel is adjustably mounted relative to the second wheel. The third and fourth wheels are configured such that the object is received between the third and fourth wheels and the respective first and second carriages.

12 Claims, 6 Drawing Sheets

Related U.S. Application Data (60) Provisional application No. 62/209,047, filed on Aug. 24, 2015.

(51) Int. Cl.
*B08B 1/00* (2006.01)
*A46B 13/00* (2006.01)
*A46B 13/02* (2006.01)
*F24S 40/20* (2018.01)
*H02S 40/44* (2014.01)

(52) U.S. Cl.
CPC ............... *B08B 1/04* (2013.01); *F24S 40/20* (2018.05); *H02S 40/44* (2014.12); *Y02E 10/40* (2013.01)

(56) References Cited

U.S. PATENT DOCUMENTS

| | | | |
|---|---|---|---|
| 6,883,201 | B2 | 4/2005 | Jones et al. |
| 7,594,473 | B2 | 9/2009 | Kitchen et al. |
| 8,500,918 | B1 | 8/2013 | Meller |
| 8,813,303 | B1 | 8/2014 | Meller |
| 9,130,502 | B1 | 9/2015 | Aly |
| 9,455,665 | B1 | 9/2016 | Meller |
| 2006/0230556 | A1 | 10/2006 | Hansen |
| 2013/0086761 | A1 | 4/2013 | Singh |
| 2013/0305474 | A1* | 11/2013 | Meller .................. B08B 5/00 15/246 |
| 2014/0310906 | A1 | 10/2014 | Zanatta |
| 2015/0349706 | A1 | 12/2015 | Grossman |
| 2016/0144870 | A1* | 5/2016 | Eitelhuber .............. B61B 13/02 104/118 |
| 2016/0178241 | A1* | 6/2016 | Jeanty .................... F24S 40/20 15/250.003 |
| 2016/0294319 | A1 | 10/2016 | Ram |

FOREIGN PATENT DOCUMENTS

| | | |
|---|---|---|
| DE | 102010008131 A1 | 2/2011 |
| DE | 10 2012 002900 | 8/2013 |
| DE | 20 2013 008573 | 10/2013 |
| DE | 202013008573 U1 | 10/2013 |
| DE | 10 2013 219460 | 3/2015 |
| EP | 2 437 001 | 4/2012 |
| EP | 2695683 A1 | 2/2014 |
| FR | 2 997 875 | 5/2014 |
| JP | 09029195 A | 2/1997 |
| JP | H10324077 A | 12/1998 |
| JP | 2003088811 A | 3/2003 |
| JP | 2014194994 A | 10/2014 |
| KR | 2010 0138698 | 12/2010 |
| WO | 2012123979 A1 | 9/2012 |

OTHER PUBLICATIONS

Examination Report in Corresponding Gulf Coast Application No. 2016/37921 dated Feb. 19, 2020. 4 pages.

"Spazzola Pulisci Pannelli Solari—Pulire Pannelli Solari, Lavaggio Pannelli Fotovoltaici." Spazzola Pulisci Pannelli Solari—Pulire Pannelli Solari, Lavaggio Pannelli Fotovoltaici. N.p., n.d. Web. <http://www.spazzolapuliscipannelli.com/index.php>. Jun. 3, 2015.

"The Stationary SunBrush." Sunbrush GmbH. N.p., 2013. Web. <http://www.sunbrush.info/index.php/en/product/stationary>.

"The Dirt Must Disappear." SIEMENS. N.p., Feb. 2015. Web. <http://www.industry.siemens.com/redirects/404-1.htm?url=http://www.industry.siemens.com/topics/global/en/magazines/process-ne>.

"רובוט לשטיפת פאנלים סולארים" YouTube. N.p., Dec. 17, 2013. Web. <https://www.youtube.com/watch?v=IoAB63i7u10>.

"1-700-700-588." YouTube. N.p., Jan. 25, 2015. Web. <https://www.youtube.com/watch?v=VCrWbuQI6hQ>.

Eurowebnet. "Lavaggio Automatizzato per Pannelli Fotovoltaici "Spazzola Rotante"" YouTube. N.p., Jul. 11, 2012. Web. <https://www.youtube.com/watch?v=Q rEPoT4lzo>.

Ncsnanocoating. "Sist Fisso Pulizia Fv .wmv." YouTube. N.p., Oct. 30, 2011. Web. <https://www.youtube.com/watch?v=tA7AC-nAUPo>.

Sunbrushinfo. "Solarreinigung Sunbrush." YouTube. YouTube, Mar. 1, 2010. Web. <https://www.youtube.com/watch?v=zqLmwzLJ_nE>.

Musab616. "Automatic Dust Cleaning System for PV Panels." YouTube. YouTube, May 16, 2012. Web. <https://www.youtube.com/watch?v=RtX-tOMnvp4>.

GSI—Geva Solar, "ה PV-Robot לניקוי פאנלים סולאריים. מוצר חדשני" YouTube. N.p., Feb. 16, 2014. Web. <https://www.youtube.com/watch?v=PzUBSt8OYrY>.

Technigeek. "Solar Panels Cleaning Systems." YouTube. N.p., May 16, 2014. Web. <https://www.youtube.com/watch?v=HuXmMWFWI60>.

Eurowebnet. "Pulizia Pannello Solare—Video Impianto Realizzato I Parte 4." YouTube. YouTube, Jun. 16, 2014. Web. <https://www.youtube.com/watch?v=QIInuBdtnJI>.

Technigeek. "Solar Panels Cleaning Robot روبوت متخصص بتنظيف لوحات الطاقة الشمسية" YouTube. YouTube, Jun. 28, 2013. Web. <https://www.youtube.com/watch?v=kO6_J7zXUpk>.

Korean Office Action in corresponding Korean Application No. 10-2018-7007807, dated Nov. 26, 2019. 30 pages including English language translation.

Chinese Office Action in Corresponding Chinese Application No. 202009270112260 dated Sep. 30, 2020 (an English translation attached hereto). 31 pages.

Korean Office Action in Corresponding Patent Application No. 10-2020-7034815 dated Sep. 27, 2021, 15 pages.

* cited by examiner

FRONT-HEAVY DUST CLEANING VEHICLE

CROSS-REFERENCE TO RELATED APPLICATION

The present invention is a divisional of U.S. patent application Ser. No. 15/240,601, filed Aug. 18, 2016, which claims priority to U.S. patent application Ser. No. 62/209,047, filed Aug. 24, 2015, all of which are incorporated by reference, as if expressly set forth in their respective entireties herein.

TECHNICAL FIELD

The present invention generally relates cleaning vehicles and, more particularly, vehicles that have a cantilevered cleaning element.

BACKGROUND

Solar panels are a green alternative to generating electric power. Large scale power generation can include arrays of solar panels located in outdoor environments for conversion of solar energy into electrical energy. However, solar panels located in outdoor environments are exposed to sand, dust, dirt and other debris that can collect on the surfaces of the solar panels and reduce the ability of the panels to absorb light and convert it into electricity. This problem is magnified when panels are located in arid environments, such as deserts, which receive high levels of solar radiation and few overcast days because these environments tend to have high levels of dust and wind leading to high deposition rates on the surface of the panels.

The solar panels can be manually swept or otherwise cleaned; however, this process can be slow, labor intensive, costly, or have all of these characteristics. The present invention is directed to these and other problems.

SUMMARY

In one embodiment, a cleaning vehicle for cleaning a surface of an object includes first and second carriages (that define a frame) and an axle extends between the first and second carriages. The vehicle also includes first and second drive wheels coupled to the axle to form a drive assembly and at least one motor is operatively coupled to the drive assembly. A cleaning element extends between and is supported by the first and second carriages at a location forward of the first and second drive wheels. The vehicle also includes first and second traveler wheels. The first traveler wheel is adjustably mounted relative to the first drive wheel and the second traveler wheel is adjustably mounted relative to the second drive wheel. The first and second traveler wheels are configured such that the object is received between the first and second traveler wheels and the respective first and second carriages.

The vehicle is designed such that the cleaning element is disposed one side of the axle (and the first and second drive wheels) and spaced therefrom by a first distance, while the first and second traveler wheels are disposed on an opposite side of the axle and spaced therefrom by a second distance.

DETAILED DESCRIPTION OF CERTAIN EMBODIMENTS OF THE PRESENT INVENTION

Figure 1A:
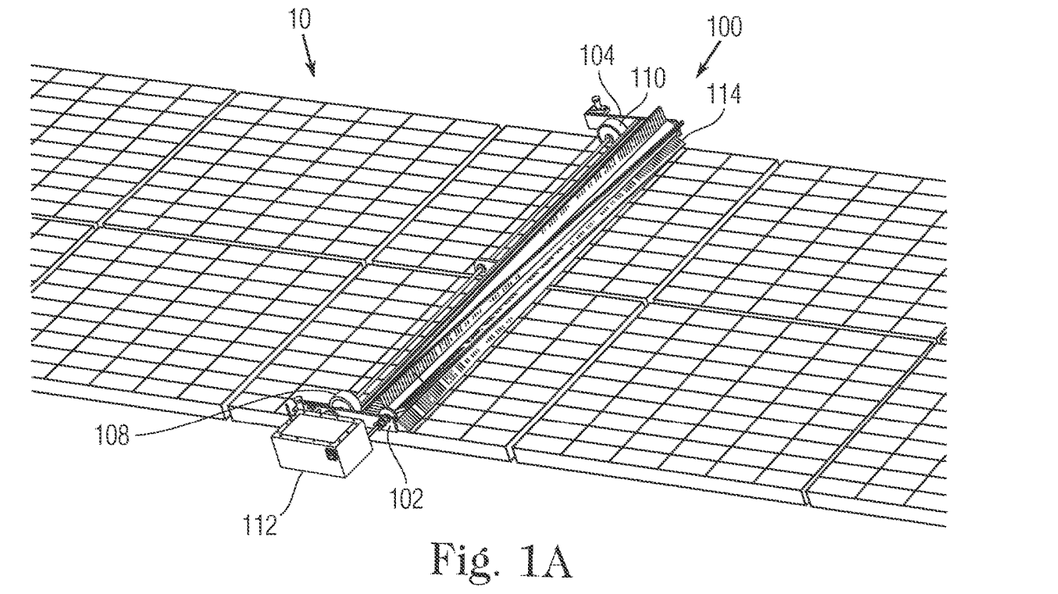
FIGS. 1A and 1B illustrate isometric views of the cleaning vehicle disposed on a solar panel according to a first embodiment of the invention.
Figure 1B:
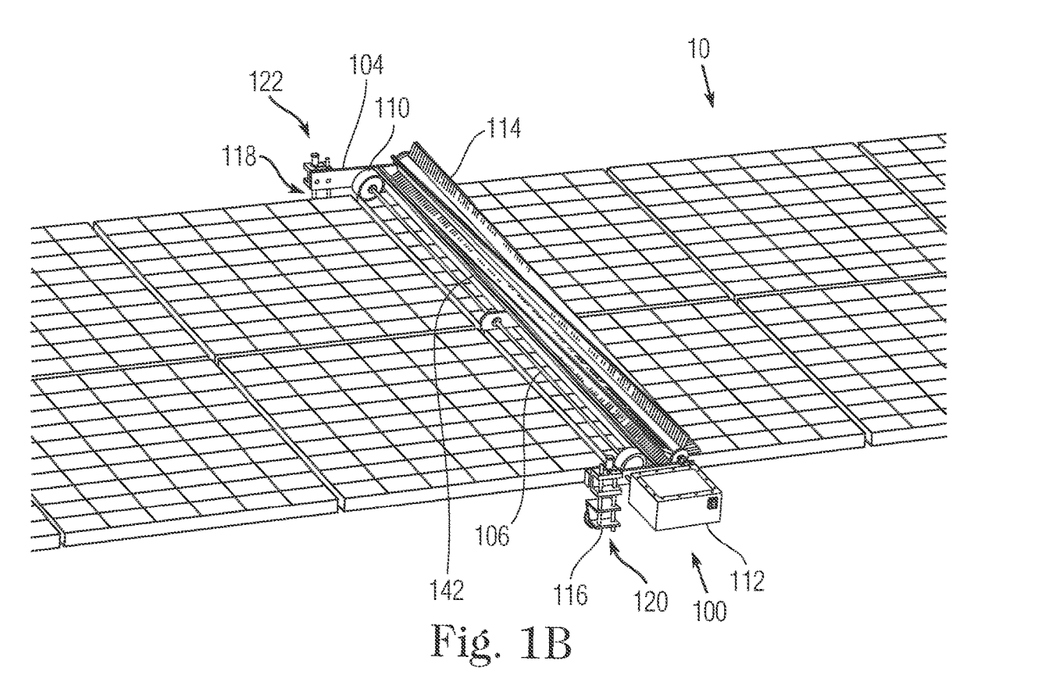

In accordance with one embodiment of the invention, referring to FIGS. 1A and 1B, a surface cleaning vehicle 100 is disposed on a solar panel array 10. The surface cleaning vehicle includes first and second carriages 102, 104 disposed on opposite ends of an axle 106. A first set of wheels comprised of first and second wheels 108, 110 are coupled to the axle 106 and are disposed at opposite ends thereof, proximate to respective carriages 102, 104. A control housing 112 is supported by one of the carriages 102, 104. The control housing 112 can include motors, control electronics, communication modules, a power source, etc., as discussed in more detail below. A cleaning element 114 extends between the carriages 102, 104 and is supported thereby. A second set of wheels comprised of third and fourth wheels 116, 118 are connected to respective carriages 102, 104 by adjustable couples 120, 122. As discussed in more detail below, the first and second wheels 108, 110 and the third and fourth wheels 116, 118 cooperate to couple the vehicle to the solar panel array 10 so that the vehicle can traverse the surface of the array and maintain the cleaning element 114 in contact with the surface of the array for cleaning.

As discussed in detail herein, in one embodiment, at least one of the first and second wheels 108, 110 can be a driven wheel, while the third and fourth wheels 116, 118 can be traveler wheels. However, as described herein, in other embodiments, an opposite arrangement is possible in that at least one of the third and fourth wheels 116, 118 is a driven wheel and the first and second wheels 108, 110 can be traveler wheels.

The carriages 102, 104 provide the supporting structural framework of the vehicle 100. The axle 106 extends between the two carriages 102, 104. Carriage 102 supports one end of the axle 106 and carriage 104 supports the other end thereof. The axle 106 is coupled to the carriages 102, 104 so that the axle 106 is free to rotate. First and second wheels 108, 110 are coupled to the axle 106 at opposite ends thereof. The first and second wheels 108, 110 are disposed proximate a respective carriage 102, 104. The first and second wheels 108, 110 contact a top surface 12 of the solar panel array 10. Accordingly, rotation of the axle 106 causes a rotation of the first and second wheels 108, 110 such that the vehicle can traverse the solar panel array 10.

It will be appreciated that the axle 106 can be eliminated and instead a different type of structural support can be provided and disposed between the two carriages 102, 104 to provide a coupling of sufficient strength between the two carriages 102, 104. For example, an aluminum extrusion can extend between the two carriages 102, 104. Alternatively, a sheet metal body/covering or any structural elements can be provided to couple the two carriages to one another. In addition, the brush core, described herein, can also provide structural rigidity between the two carriages.

When axle 106 is eliminated, it will be appreciated that the first and second wheels 108, 110 are otherwise coupled to the two carriages 102, 104 to permit free rotation of the first and second wheels 108, 110. As described herein, in one embodiment, only one of the first and second wheel 108, 110 is driven and therefore, a single axle or drive shaft connected between the one driven wheel 108, 110 and a drive motor (described herein) can be provided. Thus, a single axle connected to both wheels 108, 110 is not required since an arrangement can be provided in which only one of the wheels 108, 110 is actively driven, while the other wheel 108, 110 is passive (slave wheel).

The cleaning element 114 can be a brush that includes bristles. However, other types of cleaning devices such as pads or fabrics can be used. The cleaning element 114 extends between the carriages 102, 104. The cleaning element 114 is coupled to the carriages 102, 104 so that the cleaning element 114 is free to rotate. The cleaning element 114 in the illustrated embodiment is generally cylindrical in shape so that effective removal of the debris can be accomplished by rotation of the cleaning element. The cleaning element 114 is sized so that it extends across the length of the solar panel array 10. The cleaning element 114 is coupled to a motor that causes the cleaning element to rotate, which can be the same motor that rotates axle 106 or a different motor that rotates the cleaning element in a different embodiment than illustrated. As the first and second wheels 108, 110 rotate such that the vehicle 100 traverses the solar panels, the cleaning element rotates to mechanically remove debris from the surface of the solar panel array 10.

Figure 2A:
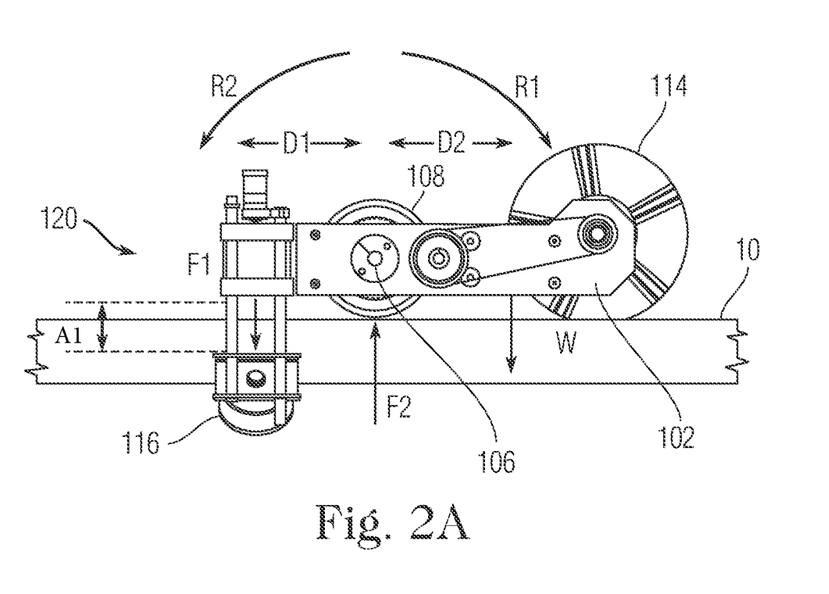
FIGS. 2A and 2B illustrate side views of the vehicle in a first and second condition.
Figure 2B:
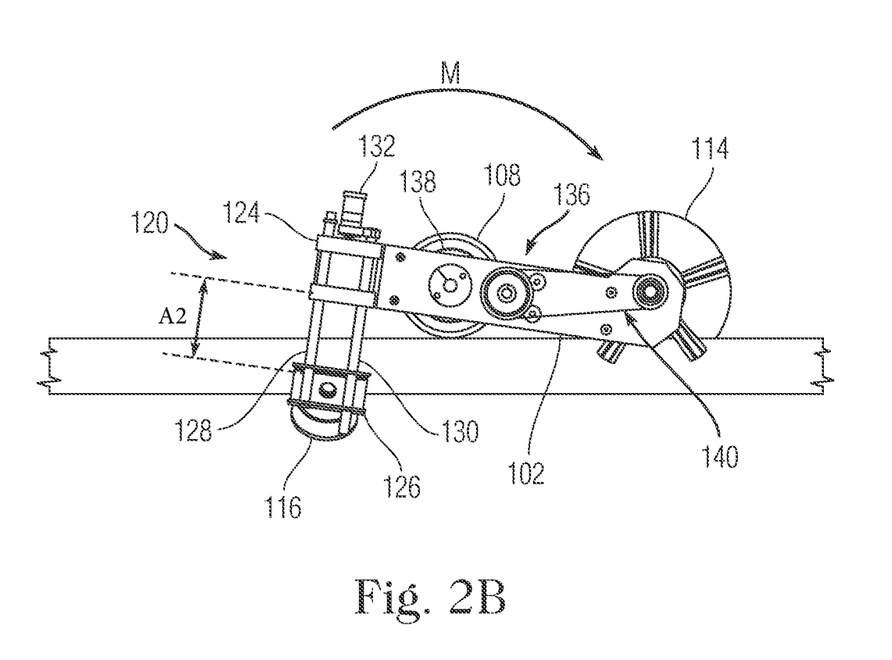
Figure 3:
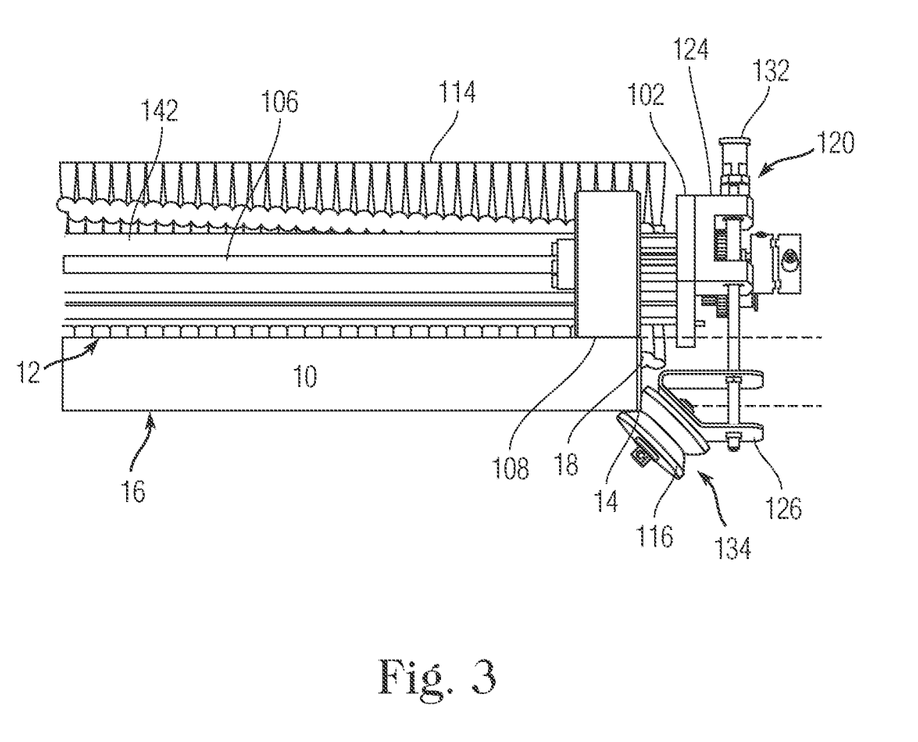
FIG. 3 illustrates a rear view of the vehicle.

Referring now to FIGS. 2A, 2B, and 3, one side of the vehicle 100 is shown on the solar panel array 10 (the control housing 112 is removed for ease of viewing). Although FIGS. 2A, 2B, and 3 illustrate only one side of the vehicle, the opposite side is arranged in a generally the same manner. The carriage 102 supports axle 106. First wheel 108 contacts an upper surface of the solar panel array 10 and is axially aligned with and coupled to axle 106. The cleaning element 114 is supported by the carriage 102 and disposed on a first side of axle 106. The adjustable couple 120 and third wheel 116 are disposed on an opposite side of the axle 106. The adjustable couple 120 and traveler wheel 116 are spaced a distance D1 from the axle 106 and the cleaning element 114 is spaced a distance D2 from the axle 106 (i.e., the third wheel 116 is located further away from the cleaning element than the first wheel 108). In this structural arrangement, the weight (W) of the cleaning element 114 results in a rotational force R1 about the axle 106 in a first direction. The third wheel 116 is in contact with an underside of the solar panel 10. Accordingly, the force between the third wheel 116 and the underside of the solar panel result in a rotational force R2 about the axle 106 that is in an opposite direction of the rotation force R1 caused by the cleaning element 114. F1 and F2 are the reaction forces experienced by the traveler wheel and drive wheels, respectively. As can be seen, the cleaning element 114 is cantilevered to the front side of the vehicle with respect to axle 106 and first wheel 108 so that the vehicle is "front heavy." Since the third wheel 116 counteracts the force generated by the cantilevered mounting of the cleaning element 114, the adjustment of the third wheel 116 can affect the positioning of the cleaning element 114, as discussed in more detail below.

The third wheel 116 extends below the carriage 102 so that the third wheel 116 can contact an underside of the solar panel array 10 while the first wheel 108 contacts the upper side of the array. The third wheel 116 is coupled to the carriage 102 via an adjustable couple 120. The adjustable couple includes a first frame member 124 attached to the carriage 102 and a second frame member 126 to which the third wheel 116 is connected. Supports 128 and 130 extend between the first and second frame members 124, 126. The two supports 128 and 130 prevent undesired rotation between the frame 126 and the rest of the vehicle in order to maintain alignment of the third wheel 116. One of the supports 130 can be threaded and connected to the frame 124 such that rotation of handle 132 causes rotation of the threaded support 130 and results in a change in the distance A between the two frame members 124 and 126. Adjusting the distance between the two frame members 124, 126 causes the third wheel 116 to move with respect to the drive wheel 10 (i.e., in the frame of reference of the vehicle, the total vertical distance between the traveler wheel and drive wheel is changed because the attachment point for the traveler wheel is moved with respect to the vehicle). If the support 130 is adjusted such that the distance between the two frame members 124, 126 is increased (i.e., A2 is greater than A1), the vehicle can then rotate about the first wheel 108 in the direction M such that the cleaning element 114 is lowered with respect to the top surface of the solar panel array, as show in FIG. 2B. If the support 130 is adjusted such that the distance between the two frame members 124, 126 is decreased (i.e., A2 is less than A1), the vehicle can rotate about the first wheel 108 in the opposite direction such that the cleaning element 114 is raised with respect to the top surface of the solar panel array. The ability to lower or raise the cleaning element 114 relative to the solar panel surface allows for adjustment of the amount of contact between the cleaning element 114 (e.g., filaments of a rotating brush) and the panel surface in the field. This structure which allows for this kind of adjustment is useful both during initial setup as well as during maintenance as the cleaning element 114 (e.g., brush filaments) can wear down over time.

Referring to FIG. 3, the solar panel 10 is disposed between the first wheel 108 and the third wheel 116. The third wheel 116 can have a concave surface profile 134 such that profile complements the bottom edge 14 of the solar panel. As such, the third wheel 116 can contact both a bottom surface 16 of the solar panel in addition to a side surface 18 of the solar panel. By contacting both the bottom and side of the solar panel, the traveler wheel can provide force in both the vertical and horizontal directions. This structural arrangement permits the traveler wheel to act as a guide which provides a normal force outwards on each side of the solar panel. This keeps the vehicle from turning, and maintains the normal force pointing downwards, which prevents the cleaning element 114 in the front from resting completely on the top surface 12 by counteracting the force of gravity acting to pull the brush down. As discussed above, the adjustable support 120 allows for the adjustment of the traveler wheel, which provides for the raising and lowering of the cleaning element through a rotation action of the vehicle. In addition, the adjustment provided by the adjustable support 120 also enables the vehicle to couple to solar panel arrays and/or guide tracks of differing thickness and geometries. Accordingly, the vehicle can be adjusted to couple to thicker solar panels by adjusting the adjustable support 120 which permits increasing the spacing between the frame members 124, 126. Conversely, the spacing can be reduced to accommodate thinner solar panels.

Referring now to FIGS. 1B and 2B, the vehicle 100 includes a control housing 112 that includes at least one motor for providing drive power to the vehicle. The motor can be coupled to the axle 106 in order to transmit power from the motor to the first wheel 108. In addition, the cleaning element 114 can be coupled to the axle 106 so that the power from the motor can also be transmitted to the cleaning element to rotate the cleaning element. A power transmission system 136 can couple the axle 106 and the cleaning element 114 so that power from the motor can be used to both rotate the first wheel 108 (causing the vehicle to translate across the surface of the solar panel) and also rotate the cleaning element (causing the cleaning element to remove debris from the surface of the solar panel). The power transmission system 136 can include a gear 138 connected to the axle 106 and a belt drive system 140 that couples the cleaning element 114 to the gear 138. Accordingly, as the axle 106 rotates, the gear 138 rotates which causes the belt drive system 140 to rotate, resulting in rotation of the cleaning element 114. The power transmission system 136 is structured and arranged such that the drive wheel 108 and the cleaning element 114 rotate in opposite directions. As such, the cleaning element rotates opposite to the direction in which the linear motion of the vehicle occurs. As the wheels drive forward, the reverse direction of rotation of the cleaning element results in more effective cleaning.

In addition, the opposite rotation of the cleaning element counteracts the torque generated by driving the drive wheels. Without powering of the cleaning element, as the motor applies a torque to drive the vehicle forward, the vehicle's body will react tending to do a 'wheelie,' i.e., the brush tends to lift from the surface. However, because the drive wheels and the cleaning element are coupled to the motor, a counteracting effect results in the same manner, but with an opposite direction. This effect is due to the torque required to drive the brush, and in particular to the torque required to start driving it, and the fact that the brush is moving opposite to the wheels. As a result, depending on which torque requirement is higher (i.e. the torque needed to accelerate the vehicle or the torque needed to start the cleaning element), the vehicle will experience either one of a 'wheelie' or a 'diving' effect. In the described arrangement, the torque required to drive the cleaning element is typically higher than the torque needed to drive the wheels and, therefore, the vehicle tends to dive forward as it accelerates forward (i.e., the cleaning element is urged toward the surface of the solar panel as a result of the torque). This is an added benefit of the design as it naturally ensures added cleaning element pressure exists when driving forward to clean the panels, while simultaneously relieving that added pressure when driving back (i.e., when the vehicle is driven in the opposite direction after a cleaning pass of the panel has been completed, the reverse torque directions tends to lift the cleaning element away from the solar panel, thereby reducing the pressure and friction therebetween). The torque effects tend to be strongest when the motion of the vehicle is started as the cleaning element overcomes static friction. The torque effect continues after startup, although not as strong, due to the sliding friction experienced between the cleaning element and the panel surface.

While a single motor may be used to rotate the drive wheels and the cleaning element, as discussed above, other motor arrangements are possible. As it typically requires more power to drive the cleaning element than it does to drive the wheels, arranging the motor to drive the cleaning element directly and the drive wheel indirectly using a power transmission system can lower the cost of the power transmission elements as they'd need to transfer less power and could therefore be smaller. On the other hand, shifting the motor to the front of the vehicle (i.e., proximate the cleaning element) will also shift the weight distribution of the vehicle and, in some cases, this may not be desired. It is also possible to drive the drive wheels and the cleaning element separately, either using separate motors for each and a clutching mechanism. For example, one possible benefit is that the cleaning element is not rotated after the vehicle completes its cleaning pass and is returning to its starting position as this will reduce power consumption and reduce wear on the cleaning element and panels. In other arrangements, one motor can drive the brush and a second motor can drive only one of the drive wheels (i.e., the other drive wheel is coupled to the axle for free rotation and not driven rotation). Three motors can also be used in which each drive wheel is driven by its own motor and the brush is driven by the third motor. It is also possible to use motors to drive the traveler wheels in addition to or instead of the drive wheels (in this case, the brush is driven by another motor).

As discussed above with respect to the illustrated embodiment, the third and fourth wheels 116, 118 can have a concave surface 134 that contacts both a horizontal and vertical surface (e.g., a bottom and a side) of the solar panel. In other arrangements, however, a guide assembly can be provided on each side of the vehicle that includes two rollers. In a two roller (per side) arrangement, one roller contacts the side of the solar panel and the other roller contacts the underside of the solar panel. The two guide roller arrangement functions similar to the traveler wheel having a convex surface in that two guide rollers provide vertical and horizontal forces to counteract the weight (W) of the cleaning element 114 and maintain the vehicle coupled to and aligned with the solar panel while minimizing friction as the vehicle travels along the surface. This latter arrangement can be particularly suitable for installations in which the solar panel(s) are mounted with a tilt beyond a certain amount, such as 30 degrees, to provide both vertical and horizontal normal forces while allowing the robot to translate along the solar panel(s) with minimal friction. In addition, a second set of side rollers (one roller per side) can be included on the vehicle located closer to the side of the vehicle having the cleaning element (e.g. in the vicinity of the F2 Arrowhead in FIG. 2A). This additional set of side rollers further assists in maintaining the vehicle in alignment with the solar panel array, especially in cases in which the vehicle spans wide or multiple solar panels.

Thus, the vehicle 100 can be widened to span multiple solar panels. Each of the carriages 102, 104 of the vehicle can couple to the outermost side of the outermost solar panel in the array. In such an arrangement, the vehicle can clean multiple solar panels in a single pass. The axle and cleaning element can be elongated to accommodate the width of the solar panel(s). A frame member 142 can extend between the two carriages to provide additional structural support so that the carriages move together and maintain alignment.

Another result of the structural arrangement of the vehicle is that the vehicle has a certain degree of "bounciness" as it traverses the panels. This bounciness comes from a combination of the materials used in the drive and traveler wheels and of any bumps or protrusions that the wheels might encounter. For example, harder materials will result in a stiffer vehicle structure while softer, rubber-like materials will act as a spring-suspension and provide some bounciness (polyurethane coated wheels with a Shore A hardness of 60A for the drive wheels and 40A for the traveler wheels can be used). Also, the height of the cleaning element relative to the surface will vary slightly as the wheels of the vehicle overcome obstacles or protrusions such as the edges of the panel frames, the gaps between panels, misalignment between one panel and the next or even some debris on the panels such as hardened bird feces or accumulated sand. Since the traveler wheels can be flexible and perform like a spring-suspension, the reduction in force required to hold the cleaning element up (due to the normal force created by the interaction of the cleaning element and the surface) causes the system to dynamically balance in a position that is higher than if there was no normal force between the cleaning element and the panels (i.e., if the cleaning element were not touching the panel). Therefore, the vehicle allows for a small degree of automatic adjustment.

The cleaning element 114 can be a brush with bristles or a cloth brush instead of using plastic filaments. If a cloth cleaning element is used, the normal force on the cleaning element might be much less significant (negligible if the cleaning element were not spinning).

In other arrangements, the distance D1 between the drive wheels and the traveler wheels can be reduced to zero (i.e., the first wheel 108 can be vertically aligned with the third wheel 116).

The present design is unique in that it puts the cleaning element in front of the wheels of the vehicle, solving a problem of reaching the end of the surface to be cleaned. Additionally, this arrangement reduces the number of moving parts on the cleaning vehicle, thus allowing for improved mechanical reliability and reduced cost. Additionally, this design allows us to adjust the cleaning vehicle to fit onto solar panels of various depths, making it easier to use on different systems with very little modification.

It should be clear that the vehicle is designed to ride directly on the edges of standard PV (photovoltaic) solar panel modules and that no additional tracks are required. The present design is suitable for use on both framed as well as frameless PV modules. In the case of framed modules, the wheels of the vehicle simply ride directly on the Aluminum frame on the PV modules. On the other hand, in the case of frameless panels, the wheels of the vehicle will ride directly on the module's main glass panel. In that case, the designer should consider the strength of the panel and strike a balance in the design parameters to ensure that the moment exerted by the vehicles wheels (on account of it being front heavy) will not break the glass. Additionally, by removing one of the support bars, the roller can be rotated outwards on the remaining support bar, for easier mounting in the case that the robot cleaning device cannot be rolled onto the end of the panels.

The vehicle can include an adjustment screw for adjusting the height of the bottom wheel (traveler wheels). This in turn results is: a) the ability to adjust the vehicle to work on different types of solar panels (with different frame heights) while on the field; and b) the ability to lower or raise the brush relative to the panel surface to control the amount of contact between the brush filaments and the panel surface on the field (this is useful both during initial setup as well as during maintenance as the brush filaments wear down over time). As described herein, there is a moment created by the reaction forces F1 and F2 as it can be controlled by a user changing D1, D2 and other vehicle design parameters. The user will look at the statics and dynamics of the vehicle and make sure that there is enough traction out of both wheels and also the wheel material is selected in order to obtain the desired springy nature thereof. It will also be appreciated that the "lower" of the bottom wheel using the adjustment screw does not result in the bottom wheel moving its position but instead, the attachment point between the bottom roller and the rest of vehicle rises away from the roller, thus allowing the brush to lower as the vehicle tilts forward.

Figure 4:
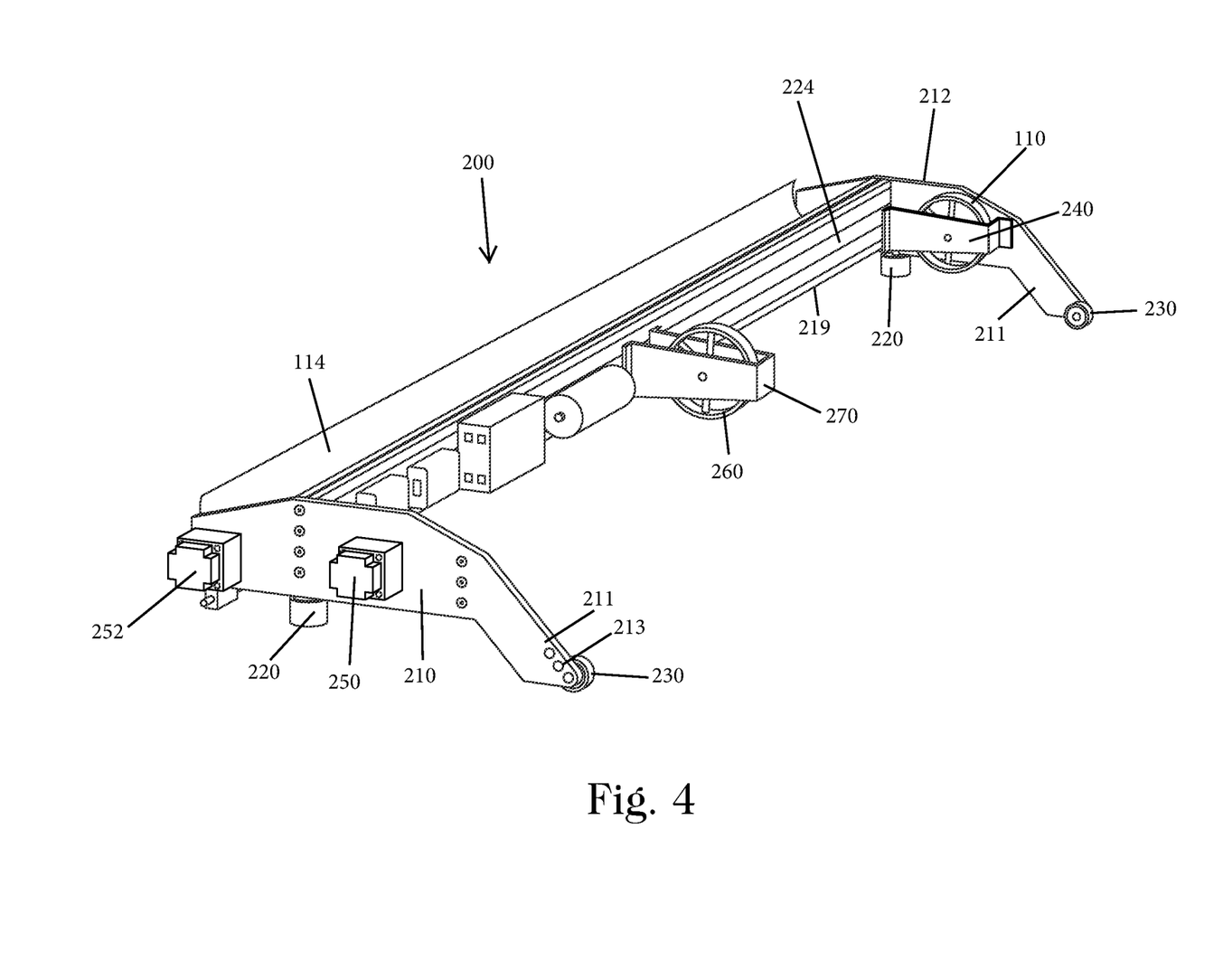
FIG. 4 is a first side perspective view of a cleaning vehicle in accordance with a second embodiment.

In addition, as shown in FIG. 4, the "traveler wheels" can take any number of different configurations and arrangements. For example, while FIG. 3 shows a single traveler wheel (i.e., the third wheel 116), it will be appreciated that, as shown in FIG. 4, more than one traveler wheel can be associated with and coupled to each carriage as discussed below. In addition, the wheels are not limited to having a concave or V-shaped construction and other constructions can equally be used. For example, in the embodiment of FIG. 4, the wheels have smooth circular shaped outer surfaces.

Figure 5:
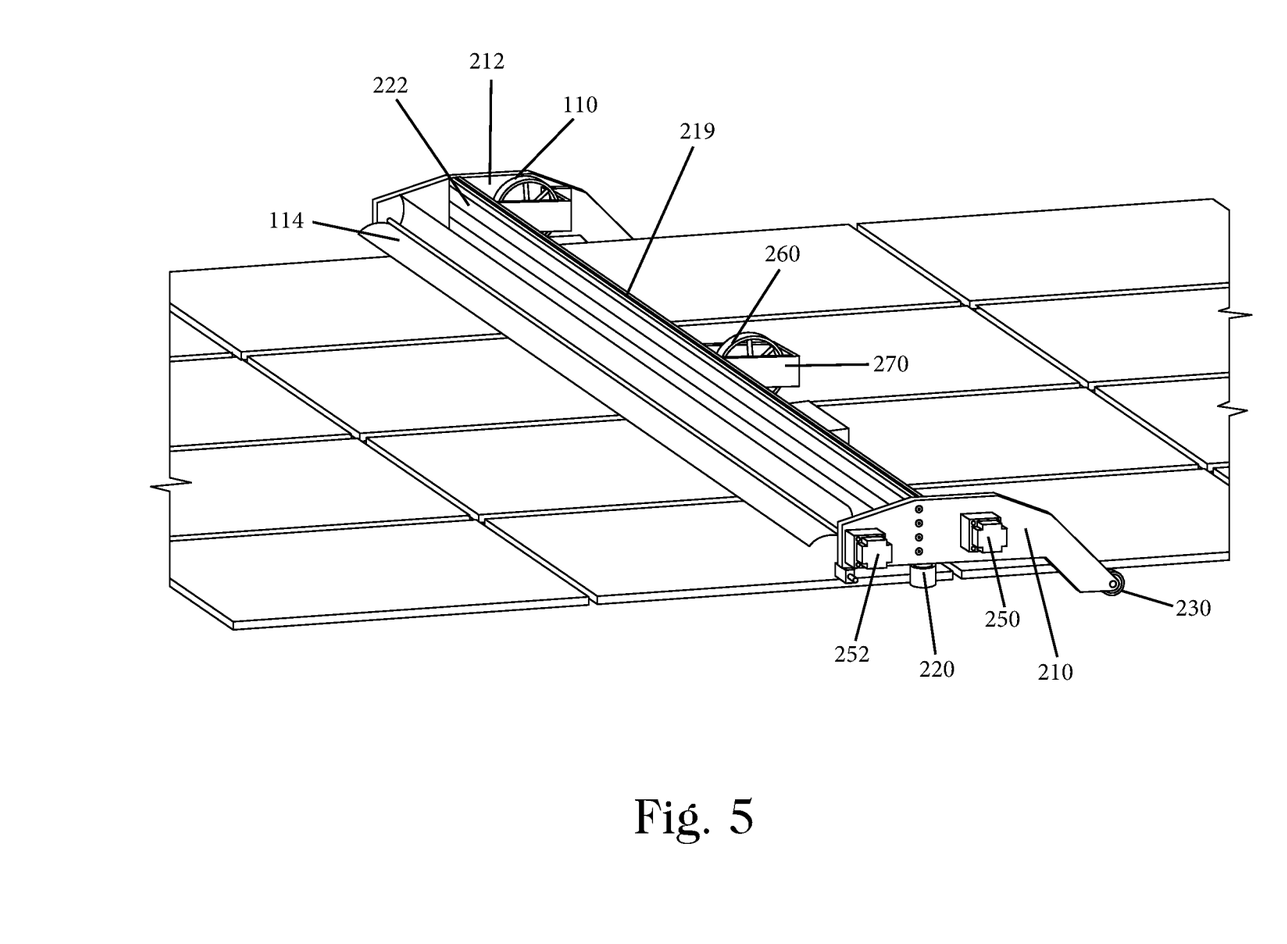
FIG. 5 is a second side perspective view of the cleaning device of FIG. 4.

In the embodiment of FIGS. 4 and 5, the counter-balancing function is separated from the sideways alignment function. More specifically, FIG. 4 shows a vehicle 200 with a first carriage 210 (similar to carriage 104) and a second carriage 212 (similar to carriage 102) being spaced therefrom and coupled thereto by a cross support member 219. The cross support member 219 can be in the form of an elongated support structure that is attached (fastened) at its ends to the first and second carriages 210, 212. The cross support member 219 has a forward face 222 and a rear face 224. Similarly, each of the first and second carriages 210, 212 has a forward facing end and a rearward facing end. The cross support member 219 can be formed of any number of different materials, including but not limited to metals, rigid plastics, etc.

As shown in FIGS. 4 and 5, the rearward facing end of each of the carriages 210, 212 has a downwardly extending arm 211. Along the downwardly extending arm 211, one or more holes 213 are formed. The illustrated embodiment has three spaced holes 213 along the arm 211.

The vehicle 200 is constructed such that each of the first and second carriages 210, 212 includes a side roller 220 and a bottom (up-stop) roller 230. While FIGS. 4 and 5 show a single side roller 220 and a single bottom roller 230 being used, it will be understood that more than one side roller 220 and more than one bottom roller 230 can be used (See, FIG. 6 which eliminates a bracket to show the wheel 110). In this embodiment, the roller 220 and roller 230 are not adjustable unlike the previous embodiment. More specifically, the side roller 220 is mounted on an axle (that is oriented perpendicular to the longitudinal axis of the carriage) and is positioned such that the contacting surface of the side roller contacts a side wall of the panel 10. The bottom roller 230 is mounted on an axle (that is oriented perpendicular to the longitudinal axis of the carriage) and is positioned such that the contacting surface of the bottom roller contacts a bottom wall of the panel 10.

The holes 213 allow for different positioning of the bottom roller 230 relative one of the respective first and second wheels 108, 110, thereby accommodating panels 10 having different thicknesses.

FIGS. 4 and 5 also show an arrangement in which only one of the first and second wheels 108, 110 is driven and in particular, in the illustrated embodiment, the second roller 110 is the one which is driven. The second wheel 110 is mounted to a first wheel support 240 (similarly, the first wheel is mounted to an identical or similar second wheel support (not shown) that is mounted to the carriage 210). Each of the first and second wheel supports 240 can be in the form of a bracket which attaches at its ends to an inner face of the corresponding carriage 210, 212. The first wheel 108 is rotatably positioned between the first wheel support 240 and the first carriage 210 and the second wheel 110 is rotatably positioned between the second wheel support 242 and the second carriage 212. A first motor 250 is operably coupled to the first wheel 108 to control rotation thereof. The first motor 250 is mounted along an outer face of the first carriage 210. A second motor 252 is also mounted to the outer face of the first carriage 210 and is operably coupled to the cleaning element 114 to controllably rotate the cleaning element 114.

Since only one motor 250 is used to drive the vehicle 200 along the panel 10, the other wheels along the top of the panel 10 are passive (slave) wheels. In the illustrated embodiment, the second wheel 110 is thus not directly driven by the motor 250 (i.e., no power transmission to the second wheel 110). In addition, since the cleaning element 114 and first wheel 108 are independently driven by motors 252, 250, respectively, there is not power transmission between the cleaning element 114 and the drive wheel (i.e., wheel 108).

FIGS. 4 and 5 also show that the vehicle 200 includes an additional optional top wheel, namely, a fifth wheel 260. Like the second wheel 110, the fifth wheel 260 is a passive wheel and is not actively driven by a motor. The fifth wheel 260 can be mounted to the cross support member 219 and more particularly, the fifth wheel 260 is mounted to a wheel bracket 270 (e.g., U-shaped bracket) that is attached to the rear face 224. The fifth wheel 260 in the illustrated embodiment is centrally located along the cross support member 220. It will be appreciated that the first, second and fifth wheels 108, 110, 260 are all oriented such that a single axis passes through the axles about which the wheels rotate. This arrangement ensures that when the vehicle 200 is placed on the top of the panel 10, each of the wheels 108, 110, 260 seats against the top of the panel 10. The fifth wheel 260 is thus positioned to provide support for weight if needed.

Figure 6:
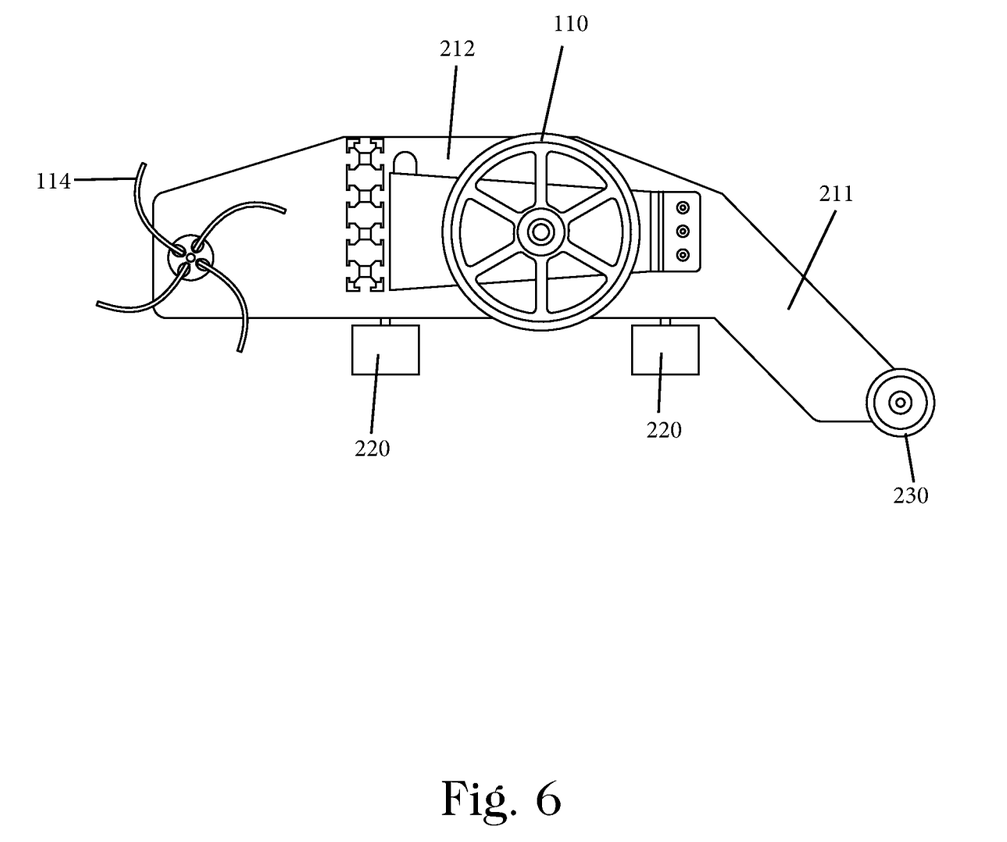
FIG. 6 is a side view of a cleaning device in accordance with a third embodiment.

FIG. 6 shows another vehicle 300 that is constructed to include two side rollers 220 and one bottom (up-stop) roller 230 per each carriage. The two side rollers 220 are spaced apart with one top wheel being at least partially disposed between the two side rollers 220. The one bottom roller 230 is located at the rear end of the carriage.

Based on the foregoing, it should be understood that the invention can be realized in a number of ways, at differing levels of specificity, as can be gleaned from the following points.

According to one embodiment, a cleaning vehicle for cleaning a surface having first and second top side edges and first and second bottom side edges is disclosed and has the following features:
first and second carriages;
an axel extending between the first and second carriages;
first and second drive wheels coupled to opposite ends of the axle;
at least one motor supported by one of the first and second carriages and coupled to the axle to transmit power from the motor to the axle so as to cause the first and second drive wheels to rotate in a first direction;
a cleaning element extending between the first and second carriages and supported thereby, the cleaning being disposed on one side of the axle and spaced therefrom by a first distance;
first and second traveler wheels disposed on an opposite side of the axle and spaced therefrom by a second distance;
first and second adjustable couples, each traveler wheel being connected to one of the first and second carriages by a respective one of the adjustable couples, wherein the adjustable couples define a spacing between a respective carriage and traveler wheel that can be altered by adjustment of the adjustable couple, the spacing being sized to receive at least a portion of the surface to be cleaned between the drive wheels and traveler wheels, and further wherein altering the spacing between a respective carriage and traveler wheel causes the cleaning element to rotate about the drive wheels.

The subject matter described above is provided by way of illustration only and should not be construed as limiting. Various modifications and changes can be made to the subject matter described herein without following the example embodiments and applications illustrated and described, and without departing from the true spirit and scope of the present invention.

What is claimed is:

1. A cleaning vehicle for cleaning a surface of an object comprising:
first and second carriages;
first and second wheels coupled to the first and second carriages, respectively, for placement along a top surface of the object;
at least one motor operatively coupled to at least one of the first and second wheels to define a drive assembly;
a cleaning element extending between and being supported by the first and second carriages;
a third wheel in the form of a side roller that is coupled to one of the first and second carriages for contacting and riding along one side of the object; and
a fourth wheel in the form of a bottom roller that is coupled to one of the first and second carriages for contacting and riding along the bottom surface of the object;
wherein the cleaning element is disposed one side of a transverse axis passing through the first and second wheels and spaced therefrom by a first distance;
wherein the fourth wheel is disposed on an opposite side of the transverse axis and spaced therefrom by a second distance, wherein the third wheel is disposed between: (1) a second transverse axis passing through the cleaning element and (2) the first transverse axis and wherein the fourth wheel is disposed below and rearward of the first and second wheels.

2. The cleaning vehicle of claim 1, wherein the first transverse axis is parallel to an axis of rotation of the first and second wheels.

3. The cleaning vehicle of claim 1, wherein a single first motor is operatively coupled to one of the first and second wheels, while the other of the first and second wheels is a non-driven wheel and the cleaning element is operatively coupled to a different second motor for controlled rotation thereof.

4. The cleaning vehicle of claim 3, wherein the first and second motors are mounted along an exterior face of one of the first and second carriages.

5. The cleaning vehicle of claim 1, wherein each of the first and second carriages includes a downwardly extending arm at a rear end thereof, the fourth wheel being mounted to one respective downwardly extending arm.

6. The cleaning vehicle of claim 5, wherein each of the downwardly extending arms includes a plurality of spaced holes which receive the fourth wheel.

7. The cleaning vehicle of claim 1, further including a cross support member attached at first and second ends thereof to the first and second carriages.

8. The cleaning vehicle of claim 1, further including:
a fifth wheel in the form of a side roller that is coupled to the other of the first and second carriages for contacting and riding along another side of the object;

a sixth wheel in the form of a bottom roller that is coupled to the other of the first and second carriages for contacting and riding along the bottom surface of the object.

9. The cleaning vehicle of claim 8, further including:
a cross support member attached at first and second ends thereof to the first and second carriages; and
a seventh wheel mounted to the cross support member and configured to ride along the top of the panel, wherein the first transverse axis passes through the seventh wheel.

10. The cleaning vehicle of claim 8, further including:
a seventh wheel in the form of a side roller that is coupled to one of the first and second carriages for contacting and riding along the one side of the object; and
an eighth wheel in the form of a side roller that is coupled to the other of the first and second carriages for contacting and riding along the other side of the object;
wherein the third wheel and seventh wheels are spaced apart from one another with the first wheel at least partially disposed therebetween;
wherein the fourth wheel and eighth wheels are spaced apart from one another with the second wheel at least partially disposed therebetween.

11. The cleaning vehicle of claim 1, wherein the cleaning element is rotatably coupled to a front end of the first and second carriages.

12. The cleaning vehicle of claim 1, wherein an axle extends between the first and second carriages, the first and second wheels being coupled to the axle.

\* \* \* \* \*